United States Patent [19]

Weinstein

[11] Patent Number: 5,331,125
[45] Date of Patent: *Jul. 19, 1994

[54] STEERING WHEEL HORN SWITCH ASSEMBLY INCLUDING HORN RING OPERATOR

[76] Inventor: Albert Weinstein, 9070 Tracy Ct. 3, Boca Raton, Fla. 33496

[*] Notice: The portion of the term of this patent subsequent to Jun. 15, 2010 has been disclaimed.

[21] Appl. No.: 74,592

[22] Filed: Jun. 11, 1993

Related U.S. Application Data

[63] Continuation-in-part of Ser. No. 834,146, Feb. 10, 1992, Pat. No. 5,219,415.

[51] Int. Cl.⁵ .............................................. H01H 9/00
[52] U.S. Cl. .................................................. 200/61.54
[58] Field of Search ............... 200/61.54, 61.55, 61.56, 200/61.57; 74/552, 484 R, 484 H; 280/728-735

[56] References Cited

U.S. PATENT DOCUMENTS

| | | | |
|---|---|---|---|
| 1,311,763 | 7/1919 | Eaton | 200/61.56 |
| 1,552,285 | 9/1925 | Feyerabend | 74/484 R |
| 1,621,408 | 3/1927 | Holstein | 200/61.56 |
| 2,109,550 | 3/1938 | Rapuano | 74/484 R |
| 2,286,016 | 6/1942 | Sladky | 200/61.56 |
| 3,712,968 | 1/1973 | Bonn et al. | 200/61.56 |
| 3,819,205 | 6/1974 | Dunford | 280/731 |
| 3,838,236 | 9/1974 | Wolf et al. | 200/61.56 |
| 4,325,568 | 4/1982 | Clark et al. | 280/731 |
| 4,504,082 | 3/1985 | Brown, Jr. et al. | 280/735 |
| 4,785,144 | 11/1988 | Fosnaugh et al. | 200/61.55 |
| 4,887,843 | 12/1989 | Husby | 280/735 |
| 5,219,415 | 6/1993 | Weinstein | 200/61.54 |

Primary Examiner—J. R. Scott
Attorney, Agent, or Firm—Oltman and Flynn

[57] ABSTRACT

In combination with a vehicle steering wheel including a rim portion and two spokes connecting the rim portion to a hub portion fitted with a restraint assembly, and having a button on each spoke for operating a horn switch, an apparatus for depressing the buttons to operate the horn switch includes an elongate member formed into an inverted U-shape having two ends and being of a width relative to the rim portion to fit within the rim portion and simultaneously extend over both the buttons while the ends rest against the rim portion, and a joining mechanism for pivotally joining each end to the rim portion, such that pushing against the elongate member depresses the buttons and operates the horn switch. The two ends of the elongate member are each preferably bent at approximately a right angle and directed away from each other. The joining mechanism preferably includes a sleeve member having a longitudinal split for closing around each L-shaped end and the rim portion, and a mechanism for locking the curved members together. The elongate member is preferably bent to form either a semi-circle or a U-shape. A method of operating a horn button on a steering wheel of an automotive vehicle, includes the steps of joining an elongate member to the steering wheel rim portion so that the elongate member is in contact with the horn button and pressing the elongate member to depress the horn button.

16 Claims, 2 Drawing Sheets

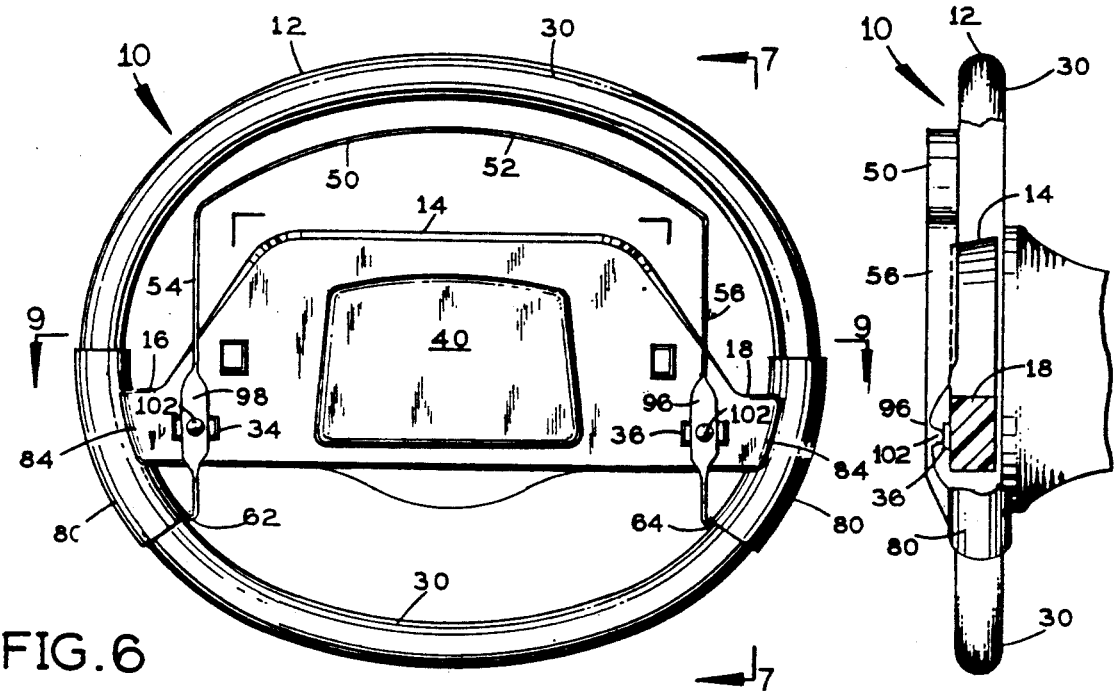
FIG. 6
FIG. 7
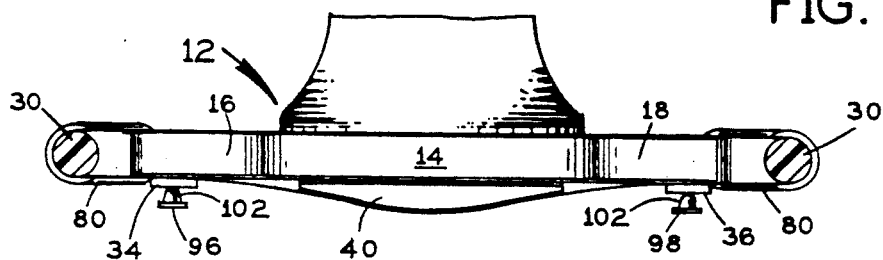
FIG. 9
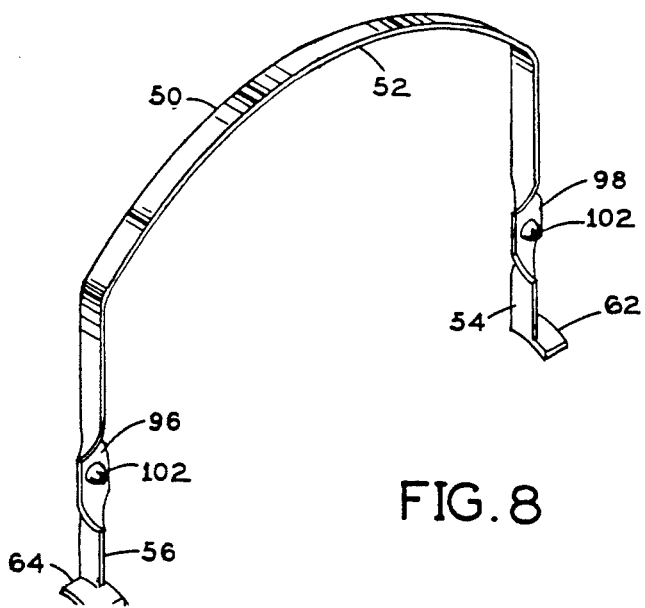
FIG. 8

STEERING WHEEL HORN SWITCH ASSEMBLY INCLUDING HORN RING OPERATOR

FILING HISTORY

This application is a continuation-in-part of application Ser. No. 07/834,146, filed on Feb. 10, 1992 now U.S. Pat. No. 5,219,415.

BACKGROUND OF THE INVENTION

1. Field of the Invention

The present invention relates generally to the field of devices on steering wheels for operating horn switches, and more specifically to an apparatus for extending the surface of horn buttons on a steering wheel, the wheel having a rim connected by two spokes to a hub equipped with an inflatable restraint, and the horn buttons being located on the spokes on either side of the restraint, the apparatus including a U-shaped ring member having two ends, each end including an outwardly directed L-shaped portion, placed in an inverted position within the rim, the ends each being pivotally secured to the wheel rim with a longitudinally split, resilient rim sleeve, and the ring member extending upward to rest against the horn buttons and to loop through the space between the restraint and the rim, and which can be quickly located and pressed to rapidly activate the horn.

2. Description of the Prior Art

There have long been buttons and levers on steering wheels for operating horn switches. Many cars made before the mid-nineteen sixties came equipped with a horn activation ring integrally manufactured with the steering wheel. These rings at least partly encircled the hub, dividing the space between the hub and the rim. In an emergency, the driver could simply extend a hand forward within the rim and be reasonably assured of striking the ring and activating the horn. This was an important safety feature because the use of the horn is often most critical in circumstances where there are only seconds to act.

This valuable feature was discontinued on later car models in favor of sleek wheel styling, and replaced with horn buttons on the hub and spokes. Then, inflatable restraint modules were placed on the hub, leaving only the horn buttons on the spokes. In the brief and stressful moments before a collision, the driver may not have time to look down at the wheel to locate these buttons. The time he loses trying to find them by touch can make the difference between successful warning and avoidance, and a fatal accident. The problem, which is most pronounced among the ill, disabled and elderly, has been compounded by the placing of numerous buttons for everything from high beam lights to cruise control on steering wheels. Various horn-activating devices have been developed over the years, but none is both compatable with a hub mounted restraint and able to provide the ready access of the horn ring.

Examples of these prior devices include that of Sladky, U.S. Pat. No. 2,286,016, issued on Jun. 9, 1942. Sladky discloses a steering wheel having a horn switch assembly which includes a pair of resiliently spaced-apart electric contact plates and a horn ring attached to one of the plates, to pivot them together and activate the horn. Although Sladky includes a horn ring as described above, the horn assembly is designed to occupy the entire wheel hub. This prevents the inclusion of a hub-mounted restraint module. Also, Sladky discloses a complete steering wheel which would have to replace an existing wheel, and this would be costly, inconvenient and detrimental to the appearance of the car.

Bonn et al, U.S. Pat. No. 3,712,968, issued on Jan. 23, 1973, teaches a steering wheel having a horn activating baffle plate, fitted with contacts and resiliently spaced above wheel spokes having corresponding contacts. A cup-shaped protrusion on each spoke opposes a cup-shaped recess in the baffle plate and the these opposing cup configurations each contain a spring to achieve the resilient spacing. Bonn et al. is intended to eliminate the need for a contact yoke, and thus simplify the horn switch assembly. A problem with Bonn et al. is that it cannot be used with an existing steering wheel. The entire wheel must be replaced, at substantial cost and loss of the aesthetic coordination of the original parts. Another problem is that Bonn, et al, designed prior to wide commercial production of inflatable restraints, occupies the hub area needed for the restraint module.

Wolf et al. U.S. Pat. No. 3,838,236, issued on Sep. 24, 1974, teaches an elongated switch, suitable for incorporation into a steering wheel to operate a horn. The Wolf et al. device covers the hub as well as at least two of the spokes. Wolf et al. provides a broad horn activating surface within the wheel rim which is easier to locate than are isolated horn buttons. Localized pressure applied to a restricted area of the switch is sufficient to cause a contact strip to make a connection and blow the horn. A problem with Wolf et al. is that, once again, it is not suited for application to an existing steering wheel and is relatively expensive. More importantly, it occupies the space where a restraint module would be located.

Dunford et al. U.S. Pat. No. 3,819,205, issued on Jun. 25, 1974, discloses an inflatable restraint module for mounting on the hub of a steering wheel having four spokes. This design, with its small, isolated horn buttons located on the spokes, presents the very safety problems identified above. Critical time can be lost trying to locate the horn buttons in an emergency.

Fosnaugh et al. U.S. Pat. No. 4,785,144, issued on Nov. 15, 1988, reveals a combination horn-blowing switch and mounting structure for a restraint module. Fosnaugh et al. makes the module itself the horn button. A problem with Fosnaugh et al. is that it is intended for installation during manufacture of the vehicle. Substantial modification and expense would likely be required to adapt it for use on an existing wheel as an after-market item. Another problem is that many steering wheels today have buttons on and around the restraint module for operating accessories other than the horn. These would be displaced by the Fosnaugh et al. device.

Clark et al. U.S. Pat. No. 4,325,568, issued on Apr. 20, 1982, discloses a modular occupant restraint system much like that of Dunford et al. except that it is shown mounted on a two-spoke steering wheel. Husby, U.S. Pat. No. 4,887,843, issued on Dec. 19, 1989, teaches a charging system for a steering wheel-mounted air bag. Clark et al. and Husby provide small horn buttons located on the spokes and therefore present essentially the same problems identified above for Dunford, et al. So does Brown et al. U.S. Pat. No. 4,504,082, issued on Mar. 12, 1985, which illustrates a small horn button mounted adjacent to the steering wheel rim.

It is thus an object of the present invention to provide an apparatus for operating the horn switch on a modern steering wheel having two spokes, whether or not the wheel is equipped with a restraint module, which can be quickly and reliably located by touch over a broad area within the rim without looking at the wheel.

It is another object of the present invention to provide such an apparatus which is removable and does not damage or require modification of the wheel.

It is still another object of the present invention to provide such an apparatus which does not detract from the appearance of the car.

It is still another object of the present invention to provide such an apparatus which does not in any way interfere with restraint operation.

It is finally an object of the present invention to provide such an apparatus which is simple in design, requires no wiring and is inexpensive to manufacture.

SUMMARY OF THE INVENTION

The present invention accomplishes the above-stated objectives, as well as others, as may be determined by a fair reading and interpretation of the entire specification.

In combination with a vehicle steering wheel including a rim portion and two spokes connecting the rim portion to a hub portion fitted with a restraint assembly, and having a button on each spoke for operating a horn switch, an apparatus is provided for depressing the buttons to operate the horn switch, including an elongate member formed into an inverted U-shape having two ends and being of a width relative to the rim portion to fit within the rim portion and simultaneously extend over both the buttons while the ends rest against the rim portion, and a joining mechanism for pivotally joining each end to the rim portion, such that pushing against the elongate member depresses the buttons and operates the horn switch.

Also provided in combination with a vehicle steering wheel including a rim portion and two spokes connecting the rim portion to a hub portion fitted with a restraint assembly, and having a button on one of the spokes for operating a horn switch, is an apparatus for depressing the button and operating the horn switch, including an elongate member having an end and extending over the button, and a joining mechanism for pivotally joining the end to the rim portion, such that pushing against the elongate member depresses the button and operates the horn switch.

The two ends of the elongate member are each preferably bent at approximately a right angle and directed away from each other. The joining mechanism preferably includes a longitudinally split, resilient sleeve member for closing around each end and the rim portion. A segment of the elongate member covers each button, and a notch is preferably cut into the member on either side of each segment to create a tab at each segment for bearing against one button. Alternatively, where the elongate member is a strip of material having two broad sides and two narrow edges, and where a segment of the elongate member covers each button, each segment is rotated one quarter turn about the longitudinal axis of the elongate member relative to portions of the elongate member immediately adjacent to the segment, to direct a broad side of the elongate member toward each button. A dimple portion or bowed portion preferably protrudes from each rotated segment toward each said horn button. The elongate member is preferably bent to form either a semi-circle or a U-shape.

Also provided in combination with a vehicle steering wheel including a rim portion and two spokes connecting the rim portion to a hub portion, and having a button on one of the spokes for operating a horn switch, is an apparatus for depressing the button to operate the horn switch, including an elongate member having an end and extending over the button, and a joining mechanism for pivotally joining the end to the rim portion, such that pushing against the elongate member depresses the button and operates the horn switch.

A method is provided of operating a horn button on a steering wheel of an automotive vehicle, the steering wheel having a hub portion connected to a rim portion by a spoke and having a horn button on the spoke, including the steps of joining an elongate member to the steering wheel rim portion so that the elongate member is in contact with the horn button and pressing the elongate member to depress the horn button.

BRIEF DESCRIPTION OF THE DRAWINGS

Various other objects, advantages, and features of the invention will become apparent to those skilled in the art from the following discussion taken in conjunction with the following drawings, in which:

FIG. 6 is a front view of a two-spoke steering wheel equipped with an inflatable restraint and fitted with the second embodiment of the inventive horn ring apparatus, having the L-shaped end portions.

FIG. 7 is a cross-sectional side view of the steering wheel of FIG. 1, showing the ring member, the location of one of the rotated sections and the position of a sleeve.

FIG. 8 is a perspective view of the ring member of the second embodiment, having the L-shaped end portions.

FIG. 9 is a cross-sectional top view of the steering wheel of FIG. 6.

DETAILED DESCRIPTION OF THE PREFERRED EMBODIMENTS

Figures 1, 2:
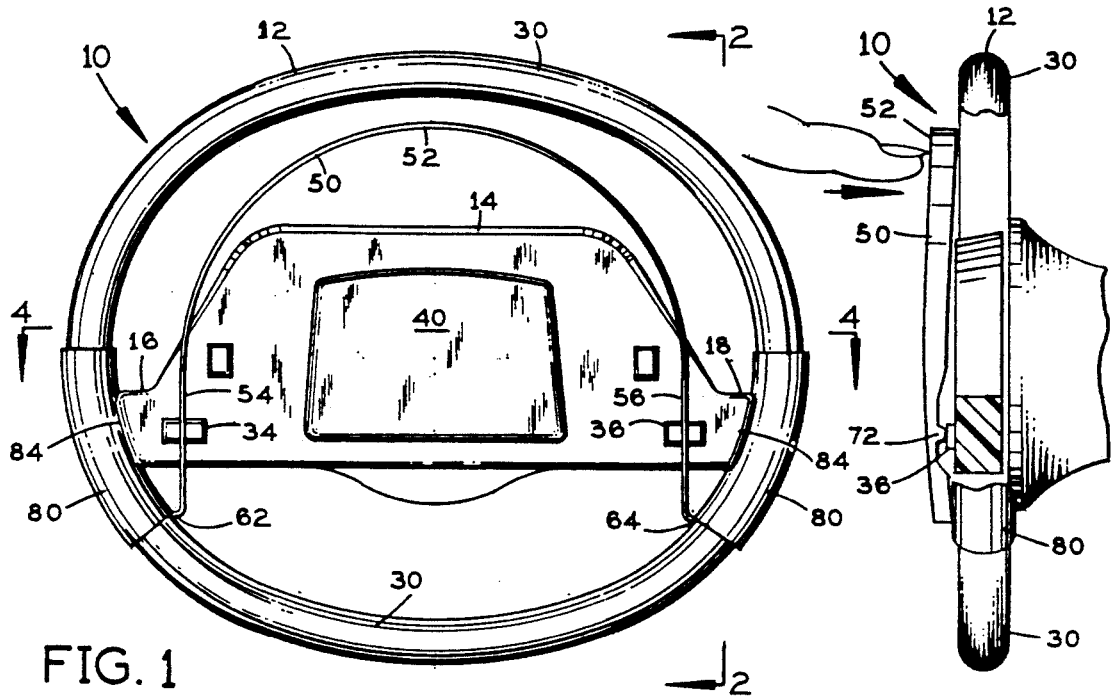
FIG. 1 is a front view of a two-spoke steering wheel equipped with an inflatable restraint and fitted with the first embodiment of the inventive horn ring apparatus, having the outwardly bent L-shaped end portions.
FIG. 2 is a cross-sectional side view of the steering wheel of FIG. 1, showing the ring member and the location of one of its tabs and of a sleeve fit into its securing position.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various FIGURES are designated by the same reference numerals.

FIRST PREFERRED EMBODIMENT

Figures 3, 5:
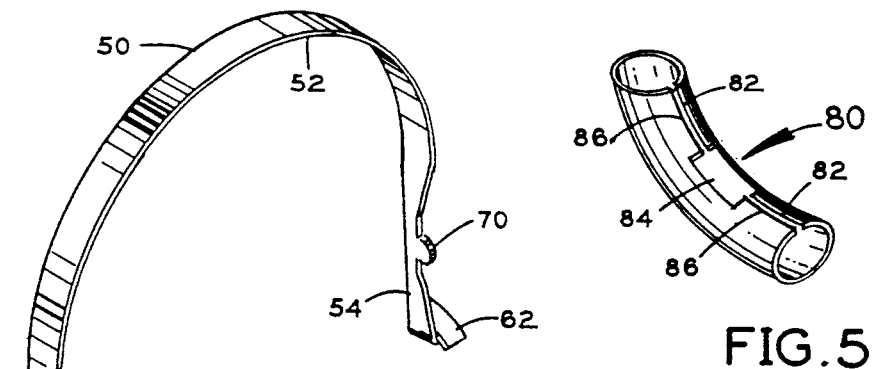
FIG. 3 is a perspective view of the ring member of the first embodiment, having the L-shaped end portions.
FIG. 5 is a front view of a split sleeve showing the cut-out portions for receiving the wheel spokes.
Figure 4:
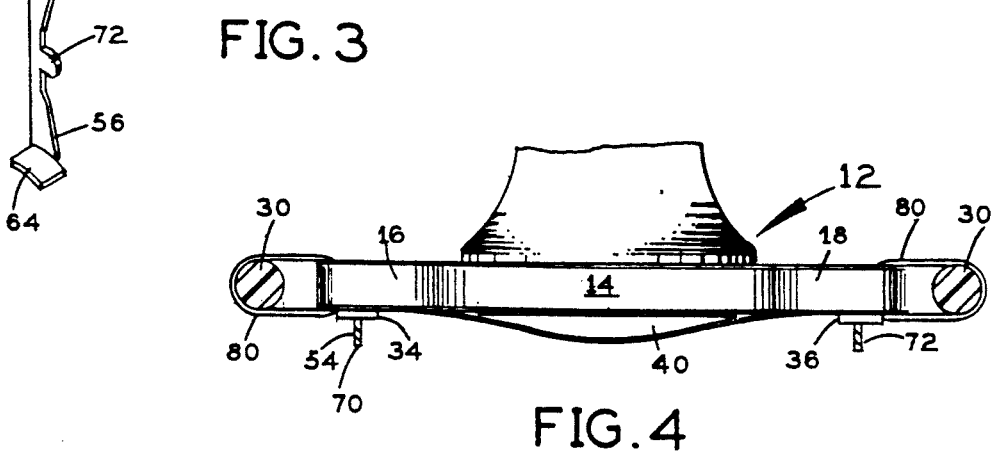
FIG. 4 is a cross-sectional top view of the steering wheel of FIG. 1.

Referring to FIGS. 1, 3 and 4, a horn operating ring apparatus 10 is disclosed for mounting on a steering wheel 12 of an automotive vehicle equipped with an inflatable restraint device. The particular steering wheel 12 illustrated includes a hub portion 14 connected by two spoke members 16 and 18 to a circular rim portion 30. Horn buttons 34 and 36 are provided on spoke members 16 and 18, respectively. Hub portion 14 includes a restraint module in the form an air bag assembly 40 positioned between buttons 34 and 36.

Apparatus 10 includes a U-shaped, elongate member 50 having a semi-circular curved portion 52 and two linear side portions, 54 and 56. Each side portion 54 and 56 terminates in an outwardly extending lateral L-shaped end portion, 62 and 64, respectively. Member 50 is preferably a flat strip of chrome-plated steel bent into the above-mentioned U-shape by doubling one of its broad sides over to face itself. Member 50 is placed on steering wheel 12 in an inverted position within rim portion 30, and is sized so that end portions 62 and 64 rest against the lower segment of rim portion 30 while side portions 54 and 56 rest on top of horn buttons 34 and 36, respectively. Notches are preferably cut out of member 50 at either side of the segment of member 50 covering each horn button, creating tabs 70 and 72. As a result, the protruding tabs 70 and 72 can depress buttons 34 and 36 not only to the level of the spoke faces, but beyond that level and into spoke members 16 and 18 for more assured horn activation.

Member 50 is removably secured to steering wheel 12 by sleeves 80. Each sleeve 80 is formed of resilient material and has a longitudinal cut or split 82 along its side. A sleeve 80 is installed on a steering wheel 12 by pulling split 82 open so that sleeve 80 can be fit around rim portion 30 and an end portion 62 or 64. In this way a sleeve 80 holds an end 62 or 64 of member 50 against rim portion 30, but with sufficient flexibility to permit member 50 to pivot from ends 62 and 64. The resilience of sleeves 80 not only holds sleeves 80 on rim portion 30, but also biases member 50 to return to its initial position. A cut-out portion 84 preferably extends from either edge 86 of each split 82 to receive a wheel spoke 16 or 18 and thus permit the sleeve 80 to completely close around rim portion 30 both above and below a spoke. Apparatus 10 can be removed from steering wheel 12 for subsequent re-use by again pulling split 82 apart and sliding sleeves 80 off rim portion 30. Then member 50 is simply lifted out of steering wheel 12. Any of several well known clamping devices may be provided in place of sleeves 80.

SECOND PREFERRED EMBODIMENT

The second embodiment is much like the first. The only difference is that, rather than creating tabs 70 and 72, the segments of member 50 which extend over horn buttons 34 and 36 are bent a quarter turn about the longitudinal axis of member 50. See FIGS. 6, 7, 8 and 9. This bending creates rotated segments 96 and 98 which present broad sides of member 50 to rest against and depress horn buttons 34 and 36. Rotated segments 96 and 98 preferably each have an extended contact point such as a dimple 102 or a bowed portion, directed toward the adjacent horn button 34 or 36. Member 50 of the second embodiment is installed, removed and operated as is member 50 of the first embodiment.

Neither preferred embodiment of apparatus 10 in any way interferes with the operation of air bag assembly 40, or with steering or with any other accessory or feature of the car. Alternatively, a car not having a wheel-mounted restraint can be fitted with apparatus 10 by slightly modifying the dimensions of member 50. Finally, while member 50 is preferably U-shaped, it can take a great many other shapes and still function as described.

METHOD

In practicing the invention, the following method may be used. An elongate member 50 is pivotally joined to a steering wheel rim portion 30 so that elongate member 50 is in contact with a horn button 34 or 36. Elongate member 50 is then pressed to activate the horn.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim as my invention:

1. In combination with a vehicle steering wheel comprising a rim portion and two spokes connecting said rim portion to a hub portion fitted with a restraint assembly, and having a button on each said spoke for operating a horn switch, an apparatus for depressing said buttons to operate said horn switch, comprising:
   an elongate member formed into an inverted U-shape having two ends and being of a width relative to said rim portion to fit within said rim portion and simultaneously extend over both said buttons while said ends rest against said rim portion,
   joining means for pivotally joining each said end to said rim portion, such that pushing against said elongate member depresses said buttons and operates said horn switch.

2. An apparatus according to claim 1, wherein said two ends are each bent at an angle and directed in opposite directions.

3. An apparatus according to claim 2, wherein said joining means comprises a sleeve member having a longitudinal split for closing around each said end and said rim portion.

4. An apparatus according to claim 1, wherein a segment of said elongate member covers each said button and a notch is cut into said member on either side of each said segment to create a tab at each said segment for bearing against one said button.

5. An apparatus according to claim 1, wherein said elongate member is a strip of material having two broad sides and two narrow edges, and wherein a segment of said elongate member covers each said button, and each said segment is rotated one quarter turn about the longitudinal axis of said elongate member relative to the portions of said elongate member immediately adjacent to each said segment, to direct a broad side of said elongate member toward each said button.

6. An apparatus according to claim 5, wherein one said segment rotated a quarter turn comprises a dimple portion to be directed toward said horn button.

7. An apparatus according to claim 5, wherein one said segment rotated a quarter turn comprises a bowed portion to be directed toward said horn button.

8. An apparatus according to claim 1, wherein said elongate member is bent to substantially form an O-shape.

9. An apparatus according to claim 1, wherein said elongate member is bent to form a U-shape.

10. In combination with a vehicle steering wheel comprising a rim portion and two spokes connecting said rim portion to a hub portion fitted with a restraint assembly, and having a button on one of said spokes for operating a horn switch, an apparatus for depressing said button and operating said horn switch, comprising:
    an elongate member having an end and extending over said button,
    joining means for pivotally joining said end to said rim portion, such that pushing against said elongate member depresses said button and operates said horn switch.

11. An apparatus according to claim 10, wherein said elongate member is bent to form a semi-circle.

12. An apparatus according to claim 10, wherein said elongate member is bent to form a U-shape.

13. An apparatus according to claim 10, wherein a segment of said elongate member covers said button and a notch is cut into said elongate member on either side of said segment to create a tab at said segment for bearing against said button.

14. An apparatus according to claim 10, wherein said elongate member is a strip of material having two broad sides and two narrow edges, and wherein a segment of said elongate member covers said button, and said segment is rotated one quarter turn about the longitudinal axis of said elongate member relative to the portions of said elongate member immediately adjacent to said segment, to direct a broad side of said elongate member toward said button.

15. In combination with a vehicle steering wheel comprising a rim portion and two spokes connecting said rim portion to a hub portion, and having a button on one of said spokes for operating a horn switch, an apparatus for depressing said button to operate said horn switch, comprising:
    an elongate member having an end and extending over said button,
    joining means for pivotally joining said end to said rim portion, such that pushing against said elongate member depresses said button and operates said horn switch.

16. A method of operating a horn button on a steering wheel of an automotive vehicle, said steering wheel having a hub portion connected to a rim portion by a spoke and having a horn button on said spoke, comprising the steps of:
    joining an elongate member to said steering wheel rim portion so that said elongate member is in contact with said horn button,
    pressing said elongate member to depress said horn button.

* * * * *